United States Patent [19]

Lorquet

[11] 4,259,203
[45] Mar. 31, 1981

[54] PARTICLES BASED ON POLYLACTONES DERIVED FROM POLYHYDROXYCARBOXYLIC ACIDS, AND PULVERULENT COMPOSITIONS IN WHICH THESE PARTICLES ARE PRESENT

[75] Inventor: Robert Lorquet, Rixensart, Belgium

[73] Assignee: Solvay & Cie., Brussels, Belgium

[21] Appl. No.: 32,003

[22] Filed: Apr. 20, 1979

[30] Foreign Application Priority Data

Apr. 24, 1978 [FR] France .................................. 78 12255

[51] Int. Cl.$^3$ ................................................ C11D 3/16
[52] U.S. Cl. ............................ 252/174.14; 252/103; 252/156; 252/174.23; 252/175; 252/180; 252/181; 210/698; 210/729; 260/29.6 PM; 260/40 R

[58] Field of Search ............ 252/156, 95, 103, 174.14, 252/174.23, 175, 180, 181, DIG. 11; 210/52, 58; 260/78.3, 29 PM

[56] References Cited

U.S. PATENT DOCUMENTS

| | | | |
|---|---|---|---|
| 3,839,218 | 10/1974 | Mulders | 252/DIG. 11 |
| 4,076,643 | 2/1978 | Brahm et al. | 252/DIG. 11 |
| 4,079,016 | 3/1978 | Brahm et al. | 210/58 |

Primary Examiner—Mayer Weinblatt
Attorney, Agent, or Firm—Spencer & Kaye

[57] ABSTRACT

Particles of polylactones derived from polyhydroxycarboxylic acids. The particles contain a bicarbonate derived from an alkali metal or from ammonium, and are useful in pulverulent compositions for washing, cleaning and bleaching.

12 Claims, No Drawings

PARTICLES BASED ON POLYLACTONES DERIVED FROM POLYHYDROXYCARBOXYLIC ACIDS, AND PULVERULENT COMPOSITIONS IN WHICH THESE PARTICLES ARE PRESENT

BACKGROUND OF THE INVENTION

The present invention relates to particles which are based on polylactones derived from polyhydroxycarboxylic acids and which readily disaggregate in an aqueous medium, and also to pulverulent compositions in which these particles are present and which can be used, in particular, for washing, cleaning and bleaching.

It is known from Belgian Pat. No. 830,603, filed June 25, 1975, to employ, in pulverulent compositions for washing, cleaning and bleaching, particles of polylactones derived from hydroxyacrylic acid polymers. These polylactones are intermolecular and intramolecular esters of α-hydroxyacrylic acid homopolymers and copolymers, are generally in the form of particles consisting exclusively of polylactones, and are usually insoluble in water. These polylactone particles are employed together with particles of a basic compound. In the abovementioned pulverulent compositions, the polylactones associated with a basic compound advantageously replace the hydroxycarboxylic acid polymers which themselves carry out, with a very substantially increased efficiency, the functions performed in the conventional compositions by alkali metal polyphosphates.

However, the polylactone particles used in accordance with the known process exhibit a serious disadvantage. The abovementioned pulverulent compositions are employed in an aqueous medium, and the polylactone particles slowly disaggregate in the medium and thus considerably slow down the washing, cleaning or bleaching process.

SUMMARY OF THE INVENTION

I have now found particles of polylactones derived from hydroxycarboxylic acid polymers which do not exhibit this disadvantage. That is, my invention relates to particles which are based on polylactones derived from polyhydroxycarboxylic acids and which contain a bicarbonate derived from an alakali metal or from ammonium.

All alkali metal or ammonium bicarbonates are suitable according to the invention. In general, for economic reasons, ammonium bicarbonate and sodium bicarbonate are used, sodium bicarbonate being most commonly employed.

In general, an effect on the ability of the polylactone particles to disaggregate in an aqueous medium is observed for amounts of bicarbonates which are as low as 1% by weight, relative to the polylactones. Similarly, amounts of bicarbonates of more than 30% no longer significantly improve the ability to disaggregate. The proportion of bicarbonates in the particles according to the invention is preferably between 3 and 20% by weight, relative to the polylactones. The best results are obtained for proportions between 5 and 15% by weight.

The polylactones derived from polyhydroxycarboxylic acids, which are used in the particles according to the invention, can be of very different types. In general, the polylactones used are derived from polyhydroxycarboxylic acids in which the main chain contains carbon atoms substituted by hydroxyl groups and carbon atoms substituted by carboxyl groups. The polylactones used according to the invention are preferably derived from polyhydroxycarboxylic acids in which the main chain contains carbon atoms which are simultaneously substituted by a hydroxyl group and by a carboxyl group. More particularly, the main chain preferably contains units of the formula

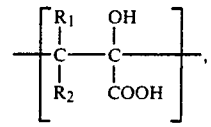

in which $R_1$ and $R_2$ represent hydrogen or an alkyl group containing from 1 to 3 carbon atoms, it being possible for $R_1$ and $R_2$ to be identical or different. The case where $R_1$ and $R_2$ represent a hydrogen atom or a methyl group, it being possible for $R_1$ and $R_2$ to be identical or different, is preferred. The best results are obtained when $R_1$ and $R_2$ represent hydrogen.

The polylactones used according to the invention are intermolecular and intramolecular esters of a α-hydroxyacrylic acid homopolymers or copolymers. In general, about 30 to 100%, and generally 40 to 100%, of the acid groups in the monomeric α-hydroxyacrylic acid units of these polylactones are esterified by alcohol groups.

The polyhydroxycarboxylic acids from which the polylactones are preferably derived are chosen from the homopolymers or copolymers containing units which have the formula defined above, and are of the same type or of several different types. When using copolymers, they are chosen from those which contain at least 50% of units as defined above, and are preferably chosen from those which contain at least 65% of such units. The best results are obtained with the polymers which only contain units as defined above.

The copolymers of which the polylactones can be used include those which contain units derived from vinyl monomers which are substituted by groups chosen from among the hydroxyl and carboxyl groups. These copolymers advantageously contain acrylic acid units of the formula

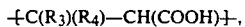

in which $R_3$ and $R_4$ represent a hydrogen atom or an alkyl group containing from 1 to 3 carbon atoms. Among these copolymers, those which contain units derived from unsubstituted acrylic acid, in which $R_3$ and $R_4$ represent hydrogen, are preferable. The polylactones derived from unsubstituted poly-α-hydroxyacrylic acid provide the best results.

The mean molecular weight of the polyhydroxycarboxylic acids from which the polylactones are derived is greater than about 300 and is advantageously between 2,000 and 1,000,000, and preferably between 3,000 and 600,000. The mean molecular weight is determined by means of FLORY's relationship from the combined results of ultracentrifugation and intrinsic viscosity measurement as described by L. Manderkern and P. J. Flory in J. Chem. Physics, 1952, 20, pages 212–214.

Regardless of their degree of polymerization and their degree of lactonization, the polylactones used according to the invention must be solid at ambient temperature. In addition to the polylactones and the bicarbonates the particles can contain small amounts, preferably less than 20% by weight, relative to the total weight, of other constitutents such as optical brighteners and dyestuffs.

DESCRIPTION OF THE PREFERRED EMBODIMENTS

The particles according to the invention have a heterogeneous structure since they comprise at least two solid phases of which one is based on polylactones and the other, which is finely dispersed in the first, is based on bicarbonates. They are advantageously manufactured by the dry mixing of extremely small elementary particles of polylactones and of bicarbonates. In general, these elementary particles have a mean diameter between 1 and 200 microns, preferably between 2 and 50 microns. The dry mixing can be carried out in any known type of mixer and is followed by a compaction which is intended to agglomerate the elementary particles with one another in order to form the particles according to the invention. For this purpose, any known type of compactor capable of exerting a sufficient pressure can be used. Preferably, the pressure exerted during the compaction is greater than 50 kg/cm$^2$, pelletizers and roll compactors being very suitable apparatus. After compaction, grinding can also be carried out in order to bring the particles to the dimensions desired for their use.

If the particles are intended for use in pulverulent compositions, the particles are preferably approximately spherical and of a similar diameter to that of the other particulate constitutents of the pulverulent compositions. In this case, the mean diameter of the particles is preferably between 0.025 and 5 mm and more particularly between 0.05 and 1.5 mm. However, for other applications, the particles can have larger dimensions, for example, of the order of one centimeter, and they can be in any form such as pellets, tablets and compressed tablets.

So as not to favor a premature reaction of the polylactones with the bicarbonates inside the particles, these particles preferably have a low water content which is preferably less than 20%, and more particularly less than 10%, by weight. For this purpose, the particles are preferably manufactured dry from elementary particles of polylactones and of bicarbonates, which also have a low water content.

It is not known what causes the improvement in the ability of the particles to disaggregate. However, it has been observed that a gaseous product is formed when the particles are brought into contact with water. Thus, it is possible that a reaction, which is accompanied by the formation of a gaseous product, takes place and causes the particles to fragment.

A further aspect of the invention relates to the pulverulent compositions, containing particles as defined above, which can be used, in particular, for washing, cleaning and bleaching. In these compositions, the particles used have approximately the same size and the same bulk density as the other powdered constituents present. The bulk density is preferably between 0.2 and 0.8 g/cm$^3$ and more particularly between 0.4 and 0.65 g/cm$^3$.

The pulverulent compositions usually contain, in addition to the particles based on polylactones, other constituents, preferably in pulverulent form, and more particularly basic compounds and peroxide compounds. The basic compounds are advantageously chosen from the silicates, phosphates, carbonates, borates or hydroxides of ammonium or of alkali metals such as sodium or potassium. Basic peroxide compounds, such as the perborates, percarbonates, perphosphates or peroxides of ammonium or of alkali metals such as sodium or potassium, can also be used.

The other constitutents are chosen as a function of the particular field of application of the composition. These can be peroxide compounds other than those mentioned above, cationic, anionic, non-ionic, amphoteric or ampholytic surface-active agents, activators for persalts, optical brighteners, foam inhibitors, enzymes, tarnishing inhibitors, agents for counteracting soil redeposition, disinfectants, corrosion inhibitors, perfumes, dyestuffs, agents used for regulating the pH, agents capable of releasing active chlorine, and the like. Furthermore, these compositions can also contain compounds having the same main function as the polylactones, such as, in particular, sodium tripolyphosphate or sodium nitrilotriacetate.

A typical composition according to the invention contains, by weight: from 0.1 to 80% of particles based on polylactones, from 10 to 95% of one or more peroxide compounds, from 0 to 60% of one or more activators for peroxide compounds and from 0 to 50% of a basic compound, the presence of which is essential if the peroxide compound does not have basic character.

Compositions of this kind are used at the rate of 0.5 to 20 g per liter of water and the temperatures at which they are used vary between 20° and 130° C., it being possible for the treatment time to vary between 1 and 200 minutes. The compositions can be employed, in particular, as washing powders for domestic use.

The following examples serve to illustrate the invention.

EXAMPLE 1 (COMPARISON)

A powder of a polylactone derived from poly-α-hydroxyacrylic acid, which contains 92% of polylactone and 8% by weight of water and has a mean particle diameter between 5 and 10μ, is converted into pellets, having a diameter of about 20 mm and a height of about 15 mm, by means of a hydraulic press, a pressure of 1 ton per cm$^2$ being applied.

The pellets are then ground on a UTL type BAUERMEISTER hammer mill, rotating at 4,800 rpm, which is equipped with a rotor having a diameter of 125 mm and a 2 mm perforated grid. The powder passing through the grid is then sieved and graded. The fine particles are recycled to the compaction stage and the coarse particles are reground.

The retained particles have a diameter between 0.250 and 1 mm. The following are examined: their friability, their bulk density by free flow and the number of non-disaggregated particles per g of product dissolved (break-up test).

The friability of the particles can be measured by pneumatically conveying a fraction of determined particle size (0.425 to 0.850 mm) in spiral-wound piping. The amount of fine particles having a diameter, observed after the test, of less than 0.425 mm is a measure of the friability of the particles.

The bulk density by free flow (SGF) is determined by a process which is analogous to that described in ASTM Standard Specifications D 392-38 and B 212-48, which are recommended for the measurement of the bulk density of molding powders and of metal powders respectively. However, the equipment used is slightly different. It comprises a hopper in the shape of a truncated cone, of which the large base has a diameter of 53 mm and the small base, which is provided with a fully-opening shut-off device, has a diameter of 21 mm, the height between the bases being 58 mm and the volume being about 60 cm³.

The cylindrical cup, which has a volume of 50 cm³, has an internal diameter of 37 mm and a height equal to about 46 mm. The base of the hopper is placed 65 mm above the bottom of the cup. The method of operation is identical to that described in the ASTM Standard Specifications. The shut-off device of the hopper is closed, the latter is filled with the product to be examined and a straight strip is used to level off to the upper edge of the hopper. The cup is placed along the axis of the hopper and the shut-off device is opened. After the material has flowed, it is levelled off to the top of the cup. The bulk density by free flow is equal to the ratio of the weight of material in the cup, expressed in kg, to the volume of the cup, expressed in dm³.

The following test is carried out in order to measure the ability to break up: about 1 g (in this case: 1.05 g) of particles is taken and they are mixed with an approximately equivalent amount (in this case: 0.8 g) of sodium carbonate and 8.37 g of a base composition for a washing powder and this mixture is introduced into one liter of water. The liquid mixture is stirred for 3 minutes with a mechanical stirrer and the suspension which is left is passed through a 425μ screen. The number of particles present on the screen is counted under UV light. The ability to break up is inversely related to the number of non-disaggregated particles having dimensions greater than 0.425 mm, per g of particles employed.

The results obtained are summarized in Table I below.

EXAMPLE 2

Identical operations to those in Example 1 are repeated, but fine NaHCO₃ is incorporated into the polylactone powder at the rate of 10% by weight, relative to the dry polylactone.

The break-up test is carried out on a sample containing 1.16 g of particles mixed with 0.73 g of $Na_2CO_3$ and a 8.37 g of a base composition for a washing powder.

The results obtained are summarized in Table I.

EXAMPLE 3 (COMPARISON)

Example 2 is repeated, but the bicarbonate is substituted by 10% by weight of fine $Na_2SO_4$.

The break-up test was carried out on a sample containing 1.16 g of particles mixed with 0.8 g of $Na_2CO_3$ and 8.37 g of a base composition for a washing powder.

The results are shown in Table I.

EXAMPLE 4 (COMPARISON)

Example 2 is repeated, the bicarbonate being substituted by 10% of sodium carbonate.

The break-up test was carried out on a sample containing 1.16 g of particles mixed with 0.70 g of $Na_2CO_3$ and 8.37 g of a base composition for a washing powder.

The results observed are shown in Table I.

TABLE I

| | Experiment 1 | Experiment 2 | Experiment 3 | Experiment 4 |
|---|---|---|---|---|
| Composition, % of the dry weight | | | | |
| polylactone (to 100%) | 100 | 90.9 | 90.9 | 90.9 |
| NaHCO₃ | — | 9.1 | — | — |
| Na₂CO₃ | — | — | — | 9.1 |
| Na₂SO₄ | — | — | 9.1 | — |
| Physical properties particle size distribution, % | | | | |
| 0.250-0.425 mm | 19.95 | 21.7 | 21.2 | 24.4 |
| 0.425-0.850 mm | 61.34 | 59.1 | 59.1 | 60.2 |
| 0.850-1.000 mm | 18.71 | 19.2 | 19.7 | 15.4 |
| friability, % on graded fraction | | | | |
| 0.425-0.850 mm | 19.2 | 15.4 | 17.3 | 19.2 |
| bulk density, kg/dm³ | 0.53 | 0.57 | 0.58 | 0.57 |
| ability to break up, number of particles/g | | | | |
| on total sample | 63 | 14 | 54 | 37 |
| on graded fraction | | | | |
| 0.425-0.850 mm | 80 | 16 | 63 | 37 |
| 0.850-1.000 mm | 60 | 11 | 75 | 23 |

It can be deduced from these average results that the addition of salts, such as $Na_2SO_4$ or $Na_2CO_3$, to the polylactone does not modify, or only very slightly modifies, the ability to break up. On the other hand, the addition of bicarbonate makes it possible substantially to reduce the number of residual particles.

EXAMPLE 5 (COMPARISON)

The conditions and the products are as in Example 1, but the pellets are compressed with a hydraulic press operating at a pressure of 0.6 ton/cm².

The break-up test was carried out on a sample of 1.05 g of polylactone mixed with 0.80 g of $Na_2CO_3$ and 8.37 g of a base composition for a washing powder.

The characteristics of the particles obtained are shown in Table II.

EXAMPLE 6

The conditions are the same as in Example 5, but 5% by weight of NaHCO₃, relative to the dry polylactone, is incorporated into the starting powder.

The break-up test was carried out on a sample of 1.10 g of polylactone mixed with 0.77 g of $Na_2CO_3$ and 8.37 g of a base composition for a washing powder.

The results are shown in Table II.

EXAMPLES 7 AND 8

Example 6 is repeated, using 10 and 15% by weight of NaHCO₃ respectively.

The break-up tests were carried out on samples of 1.16 and 1.21 g of polylactone mixed with 0.73 and 0.70 g of $Na_2CO_3$, respectively, and 8.37 g of a base composition for a washing powder.

The results are shown in Table II.

TABLE II

| | Experiment 5 | Experiment 6 | Experiment 7 | Experiment 8 |
|---|---|---|---|---|
| Composition % of the dry weight | | | | |
| polylactone (to 100%) | 100 | 95.2 | 90.9 | 87 |
| NaHCO₃ | — | 4.8 | 9.1 | 13 |
| Physical properties particle size distribution, % | | | | |
| 0.250-0.425 mm | 26.0 | 29.5 | 26.5 | 29.7 |
| 0.425-0.850 mm | 65.7 | 61.8 | 63.6 | 61.2 |
| 0.850-1.000 mm | 8.3 | 8.7 | 10.0 | 9.1 |

TABLE II-continued

|  | Experiment 5 | Experiment 6 | Experiment 7 | Experiment 8 |
|---|---|---|---|---|
| bulk density kg/dm³ | 0.45 | 0.45 | 0.46 | 0.47 |
| ability to break up, number of particles/g |  |  |  |  |
| on total sample | 5 | 3 | 1 | 1 |
| on graded fraction |  |  |  |  |
| 0.425–0.850 mm | 28 | 0 | 1 | 0 |
| 0.850–1.000 | 1 | 1 | 0 | 0 |

It can be deduced from these results that the addition of 5% of bicarbonate to the polylactone, followed by compaction at moderate pressure, suffices to produce granules exhibiting an excellent disintegration in an aqueous medium. The addition of amounts of the order of 15% makes it possible to obtain a break-up which has become virtually quantitative.

What is claimed is:

1. Particles capable of disaggregation in an aqueous medium, consisting essentially of polylactones which are intermolecular and intramolecular esters of hydroxycarboxylic acid polymers containing units of the formula

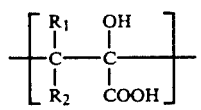

in which $R_1$ and $R_2$ independently represent hydrogen or an alkyl group having 1 to 3 carbon atoms, and at least 1% by weight, relative to the polylactones, of a bicarbonate of an alkali metal or ammonium.

2. Particles according to claim 1 wherein said bicarbonate is sodium bicarbonate.

3. Particles according to claims 1 or 2 wherein said bicarbonate is present in an amount of between 3 and 20% by weight relative to the polylactones.

4. Particles according to claims 1 or 2 consisting essentially of a dry mixture of elementary particles of said polylactones and of said bicarbonate, said elementary particles having a mean diameter of between 2 and 50 microns.

5. Particles according to claims 1 or 2 wherein said particles have a mean diameter between 0.05 and 1.5 mm.

6. Particles according to claims 1 or 2 containing less than 10% by weight of water.

7. Particles according to claim 1 or 2, wherein said hydroxycarboxylic acid polymers consist exclusively of units of the formula

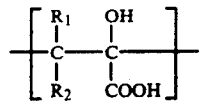

8. Particles according to claim 7 wherein the polylactones are esters of unsubstituted poly-α-hydroxyacrylic acid.

9. Particles according to claim 1 wherein said bicarbonate is present in an amount of up to 30% by weight relative to the polylactones.

10. A pulverulent composition for washing, cleaning and bleaching comprising 0.1 to 80% by weight of particles capable of disaggregation in an aqueous medium, consisting essentially of (1) polylactones which are intermolecular and intramolecular esters of hydroxycarboxylic acid polymers containing units of the formula

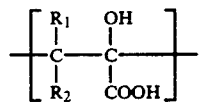

in which $R_1$ and $R_2$ independently represent hydrogen or an alkyl group having 1 to 3 carbon atoms, and (2) at least 1% by weight, relative to the polylactones, of a bicarbonate of an alkali metal or ammonium.

11. A pulverulent composition according to claim 10 wherein said hydroxycarboxylic acid polymers consists exclusively of units of the formula

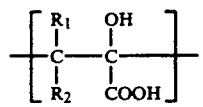

12. A pulverulent composition according to claim 11 wherein said bicarbonate is present in the particles in an amount of up to 30% by weight relative to the polylactones.

* * * * *